United States Patent [19]

Chung

[11] Patent Number: 5,032,181

[45] Date of Patent: Jul. 16, 1991

[54] CARBON FIBER REINFORCED CEMENT CONCRETE COMPOSITES IMPROVED BY USING CHEMICAL AGENTS

[76] Inventor: Deborah D. L. Chung, 3812 Henley Dr., Pittsburgh, Pa. 15235

[21] Appl. No.: 352,118

[22] Filed: May 15, 1989

Related U.S. Application Data

[63] Continuation-in-part of Ser. No. 183,775, Apr. 20, 1988, abandoned.

[51] Int. Cl.$^5$ .................. C04B 14/38; C04B 24/12
[52] U.S. Cl. ................... 106/717; 106/727; 106/734; 106/808
[58] Field of Search ............ 106/90, 99, 314, 315, 106/717, 727, 734, 808

[56] References Cited

U.S. PATENT DOCUMENTS

| | | | |
|---|---|---|---|
| 3,553,077 | 1/1971 | Quint | 106/99 |
| 3,801,338 | 4/1974 | Whitaker | 106/315 |
| 3,891,454 | 6/1975 | Cunningham et al. | 106/89 |
| 3,922,172 | 11/1975 | Crinkelmeyer et al. | 106/315 |
| 4,058,405 | 11/1977 | Snyder et al. | 106/87 |
| 4,133,928 | 1/1979 | Riley et al. | 428/255 |
| 4,316,925 | 2/1982 | Delmonte | 428/105 |
| 4,337,094 | 6/1982 | Tokar | 106/315 |

FOREIGN PATENT DOCUMENTS

| | | | |
|---|---|---|---|
| 56-017966 | 2/1981 | Japan | 106/99 |
| 56-129657 | 10/1981 | Japan | 106/99 |
| 57-100953 | 6/1982 | Japan | 106/99 |
| 59-008654 | 1/1984 | Japan | 106/99 |
| 61-036147 | 2/1986 | Japan | 106/99 |
| 0494366 | 12/1975 | U.S.S.R. | 106/99 |
| 0833813 | 5/1981 | U.S.S.R. | 106/99 |

OTHER PUBLICATIONS

Akihama et al., Concrete Int.: Design & Construction 10(1), 40 (1988).
V. S. Ramachandran, Cem. Concr. Res. 6(5), 623-31 (1976).

Primary Examiner—William R. Dixon, Jr.
Assistant Examiner—Anthony J. Green

[57] ABSTRACT

Portland cement concrete-carbon fiber structure displays high tensile and flexural strengths, low electrical resistivity and high electromagnetic interference shielding effectiveness. The structure comprises cement concrete having a small predetermined proportion of carbon fibers dispersed therein. During the fabrication of the structure, there is added thereto an accelerating admixture comprising polyethanolamine and one of metal sulfate plus metal aluminum sulfate or metal nitrite plus metal chloride. The accelerating admixture comprises a small predetermined weight percentage of the cement in the structure. Additional improvements are obtained by using a small proportion of water-reducing agents.

19 Claims, 10 Drawing Sheets

100 microns 100 microns

CARBON FIBER REINFORCED CEMENT CONCRETE COMPOSITES IMPROVED BY USING CHEMICAL AGENTS

This application is a continuation-in-part of application Ser. No. 07/183,775, filed Apr. 20, 1988 and now abandoned.

BACKGROUND OF THE INVENTION

1. Field of the Invention

This invention relates to cement concrete-carbon fiber composites which display high tensile and flexural strengths, low electrical resistivity and high electromagnetic interference shielding effectiveness.

2. Description of the Prior Art

The addition of short or continuous inorganic fibers (glass, asbestos, steel, carbon, etc.) increases the tensile and flexural strengths of concrete cements. However, asbestos fibers are carcinogenic, steel fibers tend to rust and glass fibers deteriorate in the highly alkaline environment of cement. Carbon fibers are inert, medically safe, as strong as steel fibers and more chemically stable than glass fibers in an alkaline environment. Moreover, carbon fibers are low in density, especially compared to steel fibers, their strength-to-density ratio is one of the highest among all fiber types. The main drawback of carbon fibers has been its high cost, and low cost is essential for most applications of cements. During the recent few years, short pitch-based carbon fibers have become common and their prices have steadily dropped. This changed economic picture, together with the attractive properties of carbon fibers, provide impetus to the commercial use of carbon fiber reinforced cements. Such a structure is disclosed in U.S. Pat. No. 4,316,925 dated Feb. 23, 1982 to Delmonte, and in U.S. Pat. No. 4,133,928 dated Jan. 9, 1979 to Riley et al.

In recent years the main development in the field of cements in general has been in the use of additives such as set-accelerating and early strength-enhancing agents and water-reducing agents. Such chemical agents also impart higher compressive strength to the cement. An example of an accelerating admixture is alkaline earth nitrite (i.e., $Ca(NO_2)_2$), 0.01-6 wt. % alkali metal bromide or alkaline earth bromide (i.e., KBr), 0.003-3 wt. % (all based on cement) triethanolamine, together with 15-25 wt. % pozzolan (i.e. fly ash). Examples of water-reducing agents are Na lignosulfonate and polyalkylaryl sulfonate. Although accelerating admixtures have been applied to cements without fiber reinforcements, they have not previously been applied to cements with carbon fiber reinforcements. Without using chemical agents, Akihama et al. required 4 vol. % short carbon fibers in order to double the tensile and flexural strengths, see Concrete International, 10 (1), 40 (1988).

For short random fibers dispersed uniformly in a matrix, the reinforcement effect is relatively low compared with that from aligned continuous fibers. For example, it has been reported that the same flexural strength was achieved with either 3 vol. % short fibers or 0.3-0.5 vol. % continuous fibers. Therefore, even though continuous carbon fibers are more expensive than short carbon fibers, they are used for the reinforcement of cement products such as concrete lids, concrete pipes, etc.

Carbon fibers have an additional advantage of having a high electrical conductivity. Since cement itself is a poor electrical conductor, the presence of carbon fibers greatly increases the electrical conductivity of the cement. The high electrical conductivity makes the cement useful as a material for anti-static flooring, the walling of electromagnetic shield rooms, etc.

The most commonly used carbon fiber length in previous work is 10 mm (0.39 in). However, it has been reported that set cement properties were improved more using 3 mm carbon fibers rather than 10 mm fibers. Furthermore, the molding properties of the cement were deteriorated by the addition of carbon fibers.

For carbon fiber reinforced cements, it is important to have good bonding between the carbon fibers and the cement matrix. For this purpose, organometallic-based coatings, latex coatings, anodic oxidation of carbon fibers, surface treatment with concentrated aqueous $HNO_3$ solution, surface treatment with chlorosulfonic acid to give hydrophilic carbon fibers and introduction of phosphate groups have been used to enhance the bonding. Water reducing agents and silica fume have been used to maintain good workability in the cement mortar and to make the fibers and the cement matrix contact each other firmly. The above-mentioned methods, though effective, have their drawbacks. The coating and surface treatment of fibers are relatively cumbersome processes. Water reducing agents introduce foam and generate a higher dry shrinkage of the specimen.

Triethanolamine is known to be a setting accelerator, see Ramachandran, Cem. Concr. Res., 6 (5), 623-631 (1976) and forms a complex with the hydrating silicate phase. Sodium sulfate, potassium aluminum sulfate, sodium nitrite and sodium chloride are other ingredients that have separately been used in cements previously, and some of these ingredients have been used together in certain proportions previously, see U.S. Pat. No. 3,891,454 dated June 24, 1975 to Cunningham et al., U.S. Pat. No. 4,058,405 dated Nov. 15, 1977 to Snyder et al., U.S. Pat. No. 3,922,172 dated Nov. 25, 1975 to Crinkelmeyer et al., U.S. Pat. No. 3,801,338 dated Apr. 2, 1974 to Whitaker, and U.S. Pat. No. 4,337,094 dated June 29, 1982 to Tokar.

A concentrated aqueous solution of the sodium salt of a condensed naphthalene sulfonic acid is a surfactant that is known to adhere to reinforcing fibers, preventing the formation of fiber balls and allowing the fibers to be uniformly dispersed in the cement slurry.

SUMMARY OF THE INVENTION

There is provided a composite concrete cement-carbon fiber structure which displays high tensile and flexural strengths, low electrical resistivity and high electromagnetic interference shielding effectiveness. The structure comprises cement having a small predetermined proportion of carbon fibers dispersed therein. The structure during the fabrication thereof has added thereto an accelerating admixture comprising polyethanolamine and one of metal sulfate plus metal aluminum sulfate or metal nitrite plus metal chloride, with the total accelerating admixture comprising a small predetermined weight percentage of the cement. The polyethanolamine is at least one of triethanolamine and diethanolamine, preferably triethanolamine, and the polyethanolamine is present in amount of from about 0.02% to about 0.1% by weight of the cement, preferably about 0.06% by weight of the cement. The metal sulfate is at least one of sodium sulfate, potassium sulfate and calcium sulfate, preferably sodium sulfate, and the metal sulfate is present in amount of from about 0.1% to about 1% by weight of the cement, preferably about 0.5% by weight of the cement. The metal aluminum sulfate is at least one of potassium aluminum sulfate and sodium aluminum sulfate, preferably potassium aluminum sulfate, and the metal aluminum sulfate is present in amount of from about 0.1% to about 1% by weight of the cement, preferably about 0.5% by weight of the cement. The metal nitrite is at least one of sodium nitrite, potassium nitrite and calcium nitrite, preferably sodium nitrite, and the metal nitrite is present in amount of from about 0.1% to about 1% by weight of the cement, preferably about 0.5% by weight of the cement. The metal chloride is at least one of sodium chloride, potassium chloride and calcium chloride, preferably sodium chloride, and the metal chloride is present in amount of from about 0.1% to about 3% by weight of the cement, preferably about 0.5% by weight of the cement.

There is also provided a composite cement concrete-carbon fiber structure which displays high tensile and flexural strengths, low electrical resistivity and high electromagnetic interference shielding effectiveness, said structure during the fabrication thereof has added thereto an accelerating admixture and a water reducing agent which is at least one of lignosulfonate, sodium naphthalene sulfonate-formaldehyde condensate, melamine sulfonate-formaldehyde condensate and polyalkylaryl sulfonate, preferably sodium naphthalene sulfonate-formaldehyde condensate in amount of from about 0.5% to about 2% by weight of the cement, preferably about 1% by weight of the cement.

In both structures mentioned above, the amount of said carbon fibers is from about 0.1% to about 4% by weight of the cement, preferably about 0.5% by weight of the cement.

BRIEF DESCRIPTION OF THE DRAWINGS

For a better understanding of the invention, reference should be had to the accompanying drawings wherein.

DESCRIPTION OF THE PREFERRED EMBODIMENTS

Example I

Figure 1:
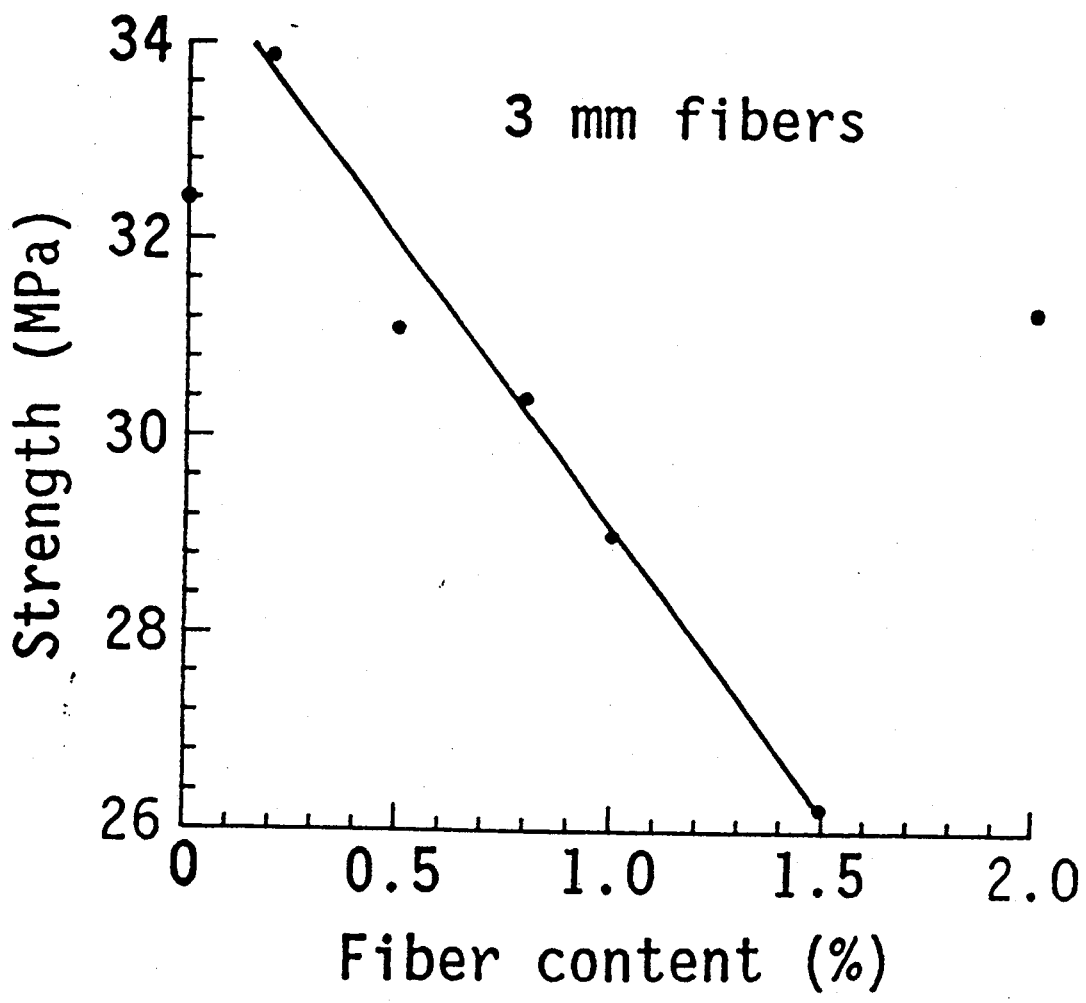
FIG. 1 is a graph of the compressive strength of carbon fiber (3.0 mm long on the average) reinforced cement mortar vs. the fiber content in percent by weight of the cement.
Figure 2:
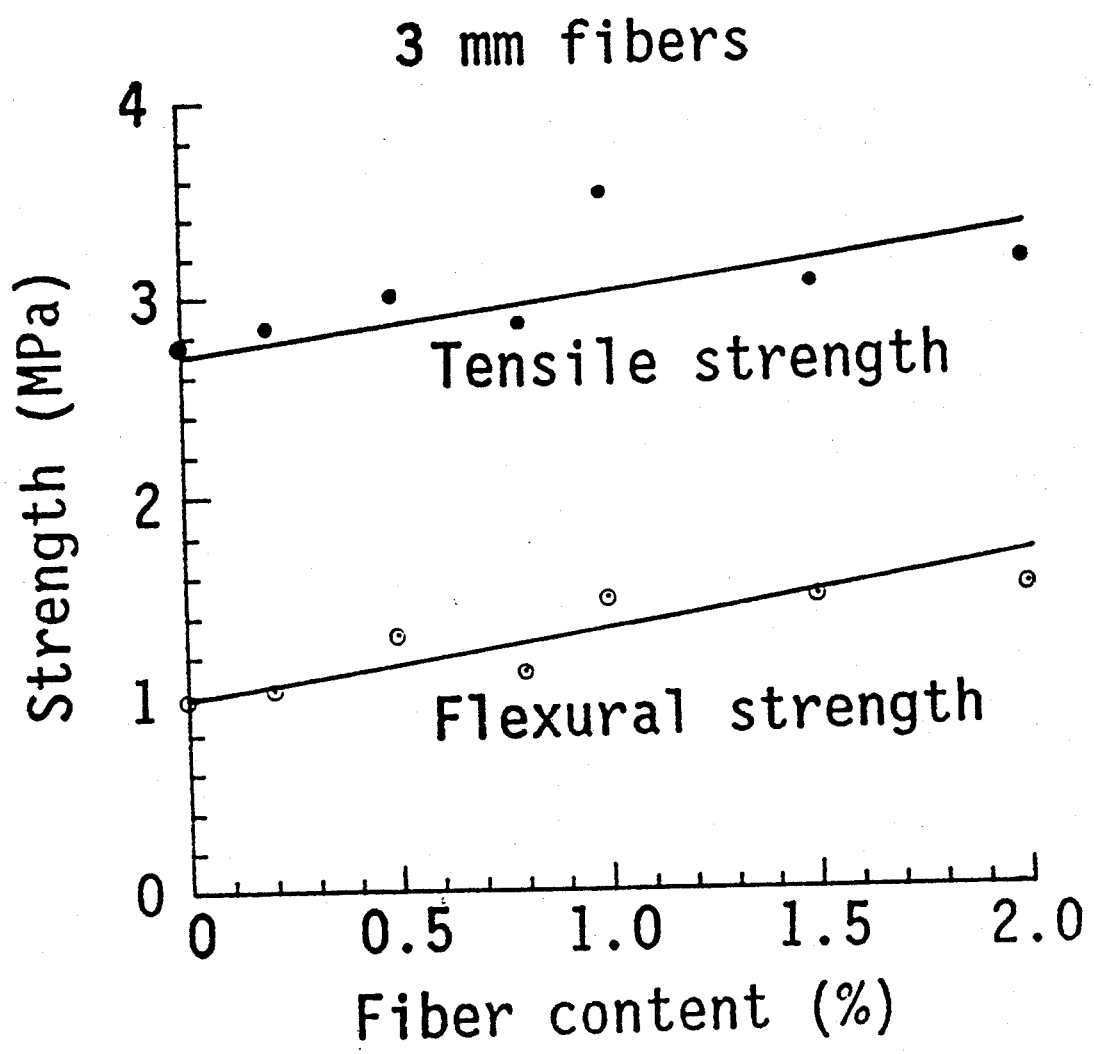
FIG. 2 is a graph of the tensile strength (solid circles) and flexural strength (open circles) of carbon fiber (3.0 mm long on the average) reinforced cement mortar vs. the fiber content in percent by weight of the cement.
Figure 3:
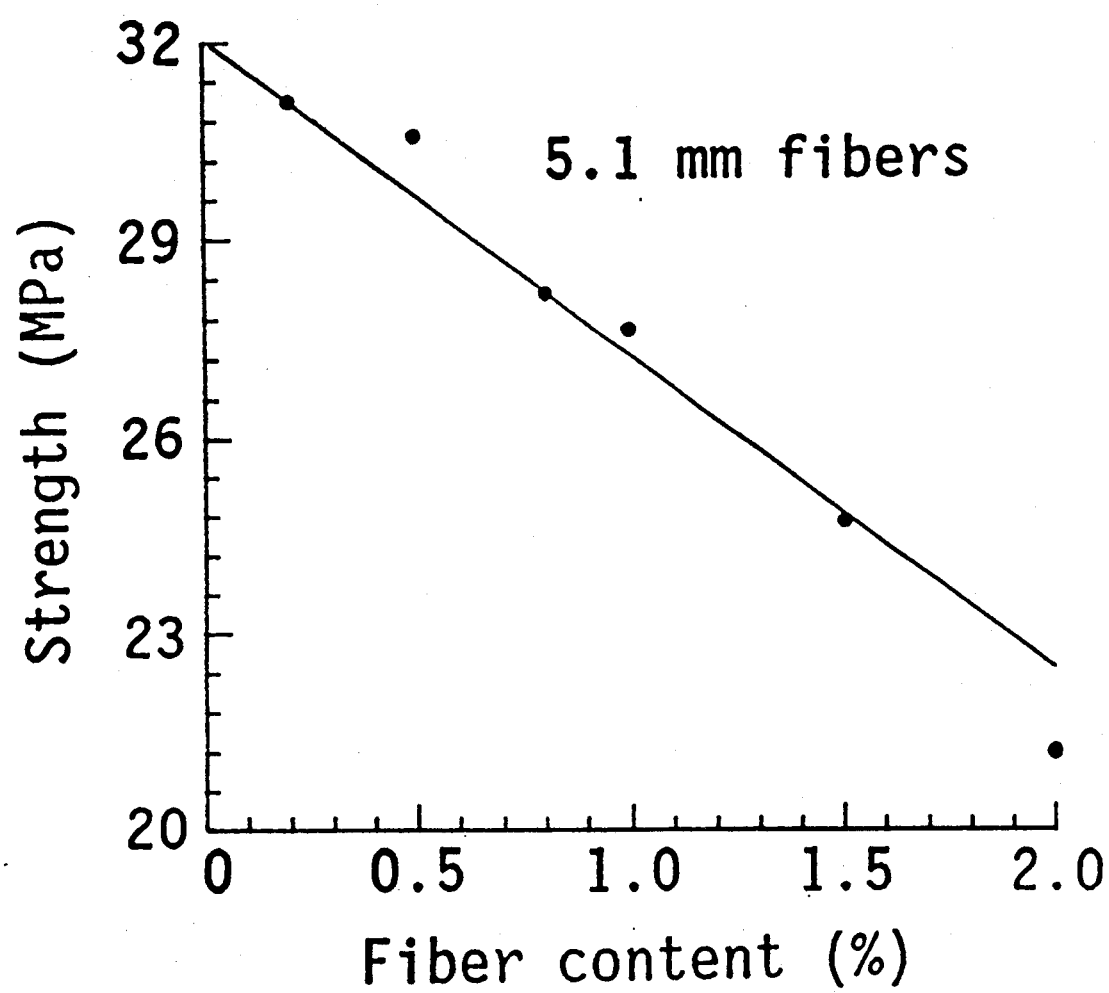
FIG. 3 is a graph of the compressive strength of carbon fiber (5.1 mm long on the average) reinforced cement mortar vs. the fiber content in percent by weight of the cement.
Figure 4:
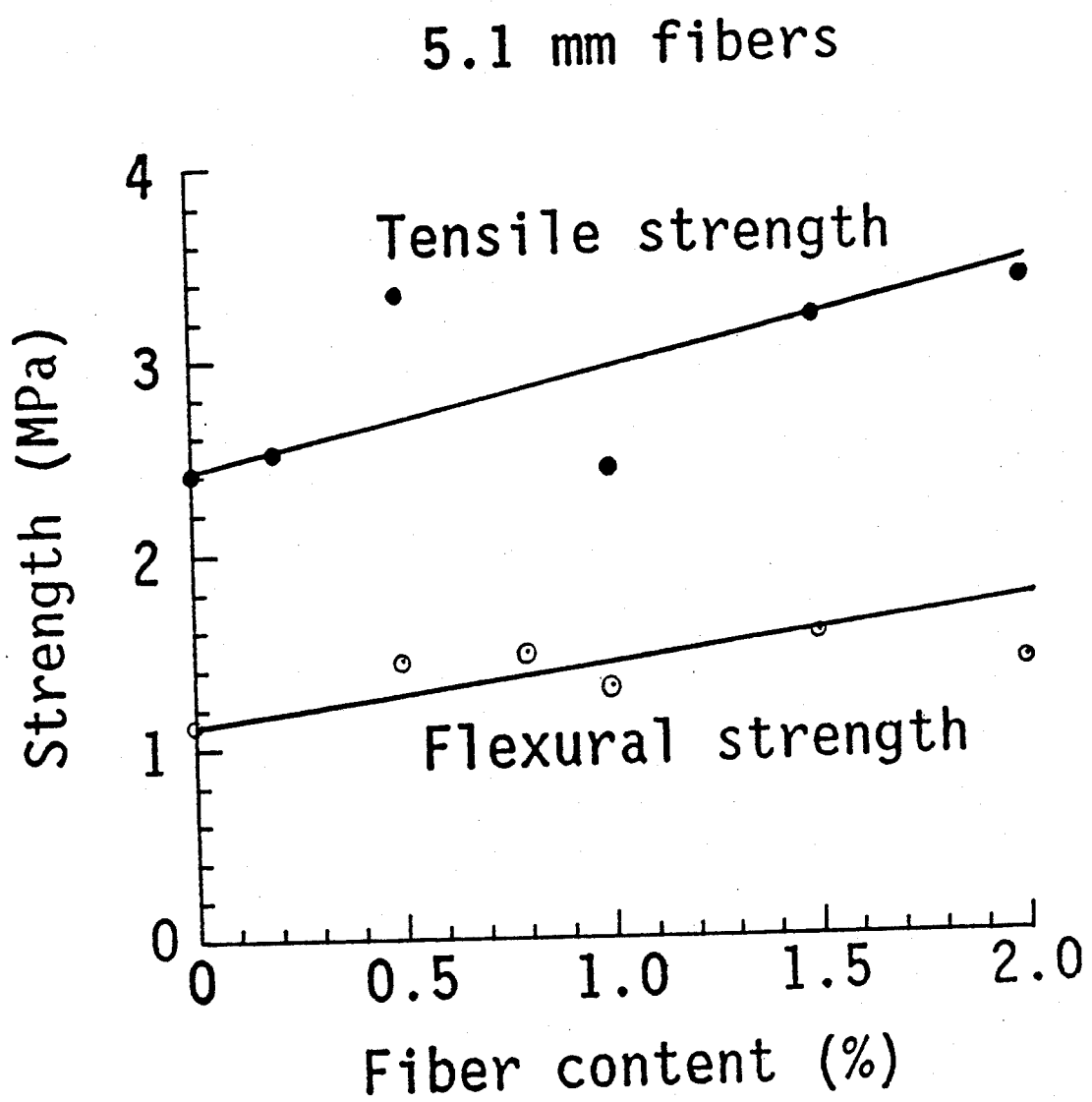
FIG. 4 is a graph of the tensile strength (solid circles) and flexural strength (open circles) of carbon fiber (5.1 mm long on the average) reinforced cement mortar vs. the fiber content in percent by weight of the cement.

This example pertains to the dependence on carbon fiber content, which ranged from 0.2 to 2.0% by weight of the cement.

The cement powder used was Portland cement (Type I) produced by Lafarge Corporation. It is composed chiefly of $3CaO.SiO_2$ (45.7 wt. %), $2CaO.SiO_2$ (30.3 wt .%), $3CaO.Al_2O_3$ (6.1 wt. %), $4CaO.Al_2O_3.Fe_2O_3$ (9.2 wt. %), together with several minor oxides such as $SO_3$ (2.63 wt. %), $MgO$ (3.38 wt. %), etc. The sand used was crystalline silica (quartz), middle grade.

Short carbon fibers were pitch-based and unsized. They were Carboflex chopped carbon fibers manufactured by Ashland Petroleum Company. Two fiber lengths were used (3.0 and 5.1 mm). The fiber properties are shown in Table I.

TABLE I

| Properties of short carbon fibers | |
|---|---|
| Filament diameter | 12 $\mu$m |
| Tensile strength | 690 MPa |
| Tensile modulus | 48 GPa |
| Elongation at break | 1.6% |
| Electrical resistivity | 30 $\mu$ohm.m |
| Specific gravity | 1.6 |
| Carbon content | 95% wt. |

No chemical agent was used in this example. The sand/cement weight ratio was 1:2 and the water/cement weight ratio was 1:2.8. As is well known, the weight ratio of sand or mineral additive to cement can vary considerably, depending upon the intended application for the product. In the following reported tests, a consistent weight ratio was used. In addition, the term concrete as used herein is intended to be generic to the described product.

The short carbon fibers were first mixed with the cement powder and sand. Then water was added and the mixture was stirred with a mixer for 2 to 3 min. Then the mortar was poured into a mold. After 24 hr the specimens were demolded and left in an air-conditioned room at 20°-22° C. and 50-70% relative humidity. After curing for 1 to 28 days, they were tested.

According to ASTM C109-30, C190-32 (C150-58) and C348-80, specimens were prepared by using respectively a 2 in (5.1 cm) cubic mold for compressive testing, a briquet mold for tensile testing and a 1.57 by 1.57 by 6.30 in (4.0 by 16.0 cm) mold for flexural testing (under three-point bending).

The specimens were characterized mechanically using standard methods and a Material Testing System (MTS) unit. For tensile tests, an MTS extensometer (Model 632.12B-20 Range) was used to measure the strain. At least three specimens of each average fiber length were tested for each type of mechanical measurement. The scatter in the data was ±10%.

The compressive, tensile and flexural strengths after 7 days of curing are shown in FIG. 1-2 and FIG. 3-4 for 3.0 mm and 5.1 mm fibers respectively. The compressive strength slightly decreased as the carbon fiber content increased, whereas the tensile strength and the flexural strength increased with increasing fiber content. The increase of the tensile strength was up to 28% for 3.0 mm fibers and up to 41% for the 5.1 mm fibers. The increase of the flexural strength was up to 55% for the 3.0 mm fibers and up to 40% for the 5.1 mm fibers.

Specimens for electrical resistivity measurement were prepared by using a 0.79 by 0.24 by 3.94 in (2.0 by 0.61 by 10.0 cm) mold. The four-probe method was used for measuring the electrical resistivity. Five data points were obtained per specimen. The scatter in the data was ±15%.

Figure 5:
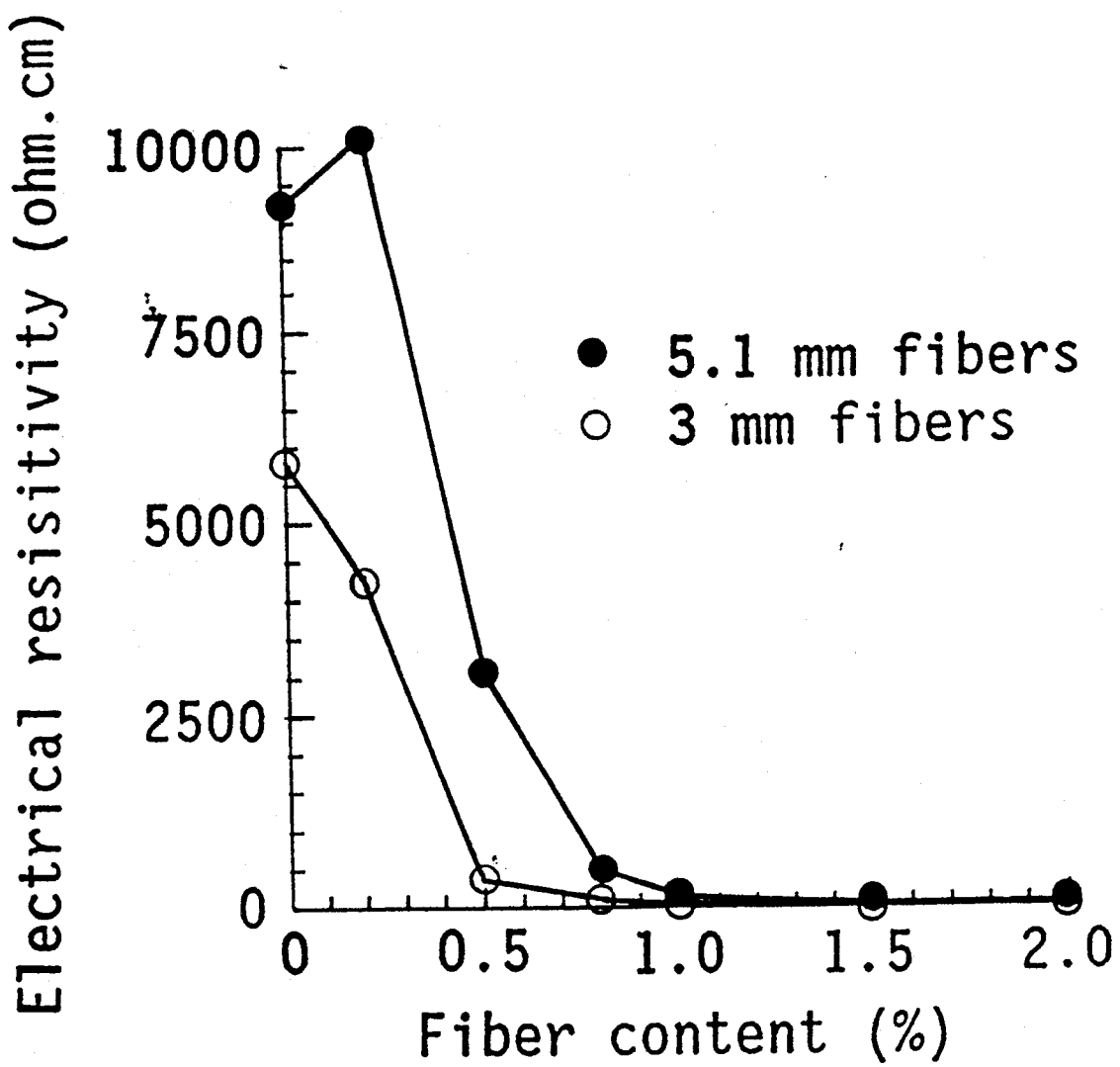
FIG. 5 is a graph of the electrical resistivity in ohm.cm of carbon fiber reinforced cement mortar vs. the fiber content in percent by weight of the cement for carbon fibers of average length 5.1 mm (solid circles) and carbon fibers of average length 3.0 mm (open circles)

The dependence of the electrical resistivity on the carbon fiber content is shown in FIG. 5. The data were obtained after 2 days of curing for the 3.0 mm fibers and after 5 days of curing for the 5.1 mm fibers. [The dependence of the electrical resistivity on the curing age was very small, as long as the cement was set (Tables IIA and IIB)]. Most of the drop in electrical resistivity occurred for fiber contents of 0.5% or less. Increase of the fiber content beyond 1% had negligible effect on the electrical resistivity.

TABLE II

Effect of curing age on the electrical resistivity in ohm.cm

A. For 3.0 mm carbon fibers

| Curing age | Fiber content (% by wt. of cement) | | | | | |
|---|---|---|---|---|---|---|
| (days) | 0.2 | 0.5 | 0.8 | 1.0 | 1.5 | 2.0 |
| 2 | 4260 | 355 | 92.3 | 29.5 | 22.2 | 17.5 |
| 5 | 5190 | 368 | 91.0 | 37.5 | 22.1 | 17.3 |
| 23 | 8730 | 378 | 93.7 | 37.9 | 22.3 | 17.2 |

B. For 0.5% fibers (by wt. of cement)

| Curing age | Fiber length (mm) | | | |
|---|---|---|---|---|
| (days) | 3.0 | 5.1 | 25.4 | 50.8 |
| 2 | 108 | 40.0 | 46.0 | 14.5 |
| 4 | 118 | 42.1 | 46.6 | 14.3 |
| 7 | 113 | 42.3 | 46.8 | 14.2 |

Examination of the data in FIG. 1-5 and the fact that carbon fibers are costly indicate that a carbon fiber content of 0.5% was optimum. Hence this value of the fiber content was chosen for more detailed investigation, as discussed in Examples II and IV.

Example II

This example pertains to the dependence on carbon fiber length.

Five average fiber lengths were used, namely 3.0, 5.1, 12.7, 25.4 and 50.8 mm. The fibers were pitch-based and unsized. They were Carboflex chopped carbon fibers manufactured by Ashland Petroleum Company. In this example, the carbon fiber content is fixed at 0.5% by weight of the cement.

No chemical agent was used in this example.

The cement powder and sand used were the same as in Example I. The sand/cement ratio and the water/cement ratio were also the same as those in Example I. The methods of specimen preparation and mechanical and electrical testing are the same as those in Example I.

Figure 6:
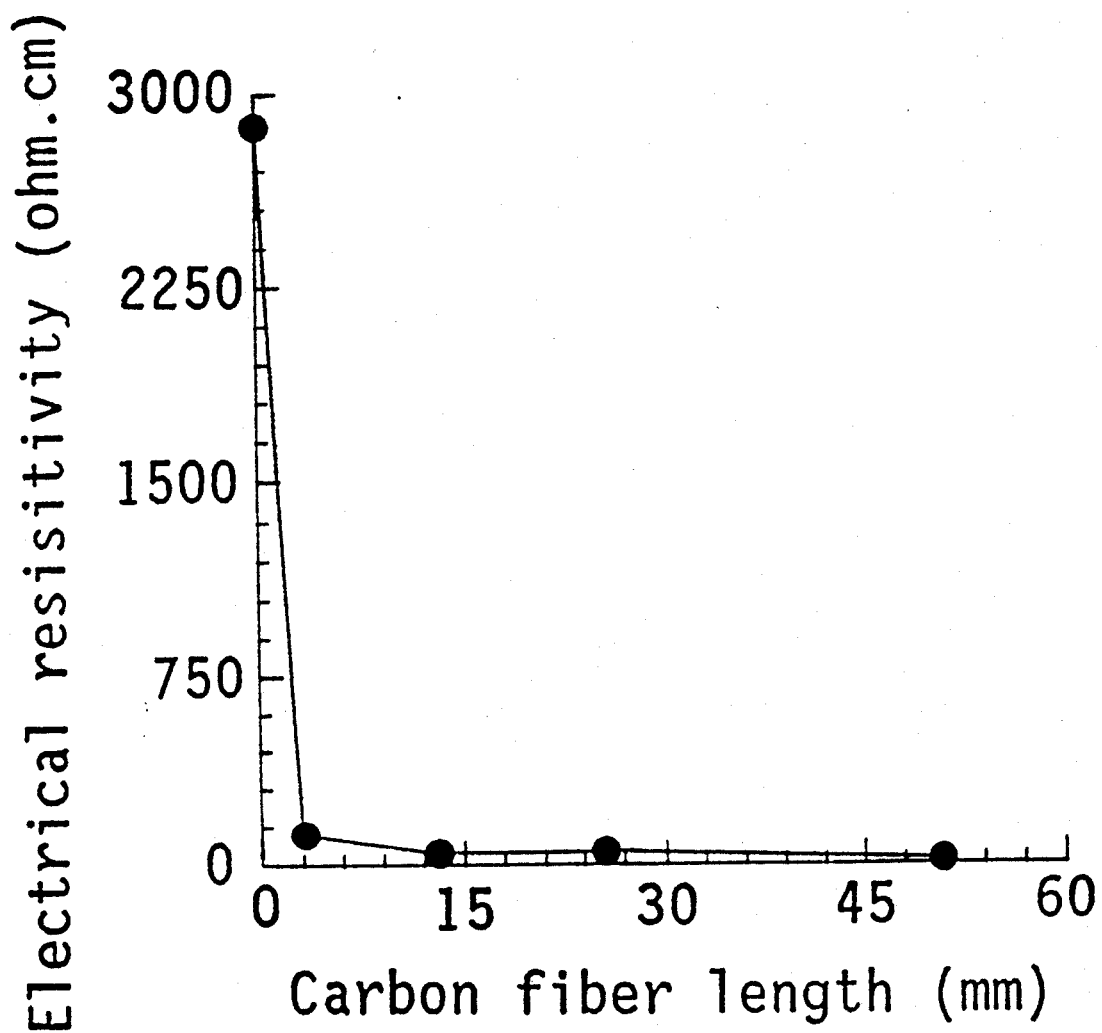
FIG. 6 is a graph of the electrical resistivity in ohm.cm of carbon fiber reinforced cement mortar vs. the average carbon fiber length in mm.

Table III shows the mechanical and electrical data obtained after 3 days of curing. The optimum lengths for most strengthening were 3.0 and 5.1 mm. The fact that the fibers of length 12.7 mm or above did not give as much strengthening as the shorter ones was due to the relative difficulty of dispersing the longer fibers. As shown in Table III and FIG. 6, the electrical resistivity decreased only slightly as the fiber length increased beyond 3.0 mm, even though the longer fibers, if well dispersed, should cause more fiber connectivity.

TABLE III

Effect of carbon fiber length on strengths and electrical resistivity for 0.5% carbon fibers

| Fiber length (mm) | 0 | 3.0 | 5.1 | 12.7 | 25.4 | 50.8 |
|---|---|---|---|---|---|---|
| Compressive strength (MPa) | 26.7 | 25.0 | 27.0 | 24.5 | 25.0 | 23.9 |
| Tensile strength (MPa) | 2.03 | 2.66 | 2.63 | 2.17 | 2.45 | 2.18 |
| Flexural strength (MPa) | 3.88 | 5.16 | 5.76 | 5.28 | 4.84 | 3.88 |
| Electrical resistivity (ohm.cm) | 2870 | 118 | / | 42.1 | 46.6 | 14.3 |

Example III

This example pertains to the effect of accelerating admixtures on cement mortar without carbon fibers.

The accelerating admixtures were of two kinds. Both kinds used triethanolamine (0.06% by weight of cement). In addition, admixture I used sodium sulfate (0.5 wt. %) and potassium aluminum sulfate (0.5 wt. %), whereas admixture II used sodium nitrite (0.5 wt. %) and sodium chloride (0.5 wt. %). These accelerating admixtures (I) and (II) will be referred to in examples which follow.

No water reducing agent was used in this Example III.

The cement powder, sand, sand/cement ratio, water/cement ratio and methods of mechanical and electrical testing are the same as those of Example I. The cement powder was first mixed with the sand. Then water and an accelerating admixture were put together and stirred with a mixer for 2 to 3 min. Then the mortar was poured into a mold. After 24 hr the specimens were demolded and left in an airconditioned room at 20°-22° C. and 50-70% relative humidity. After curing for 1 to 28 days, they were tested.

Table IV gives the mechanical data obtained at curing ages from 1 to 7 days for the plain cement mortar, the cement mortar with accelerating admixture I and the cement mortar with accelerating admixture II. For a curing age of 1 day, accelerating admixture I caused a 55% increase in the compressive strength whereas accelerating admixture II caused a 63% increase in the compressive strength. The fractional increases in the tensile and flexural strengths were lower than those in the compressive strength. For example, accelerating admixture I caused the tensile strength at a curing age of 1 day to increase by 24%, while accelerating admixture II caused tensile strength at a curing age of 1 day to increase by 33%.

TABLE IV

Effect of accelerating admixture on strengths

| | Strength (MPa) | | | | | | | | |
|---|---|---|---|---|---|---|---|---|---|
| | Compressive | | | Tensile | | | Flexural | | |
| Curing Time (days): | 1 | 3 | 7 | 1 | 3 | 7 | 1 | 3 | 7 |
| 1 Plain cement mortar | 15.4 | 27.8 | 29.6 | 1.47 | 1.64 | 1.82 | 3.12 | 3.68 | 3.76 |
| 2 With accelerating admixture I | 23.8 | 28.9 | 39.9 | 1.82 | 2.07 | / | 4.08 | 5.08 | / |
| 3 With accelerating admixture II | 25.1 | 32.3 | 41 | 1.96 | / | / | 3.64 | / | 4.0 |

EXAMPLE IV

This example pertains to the effect of carbon fibers, accelerating admixtures and a water reducing agent on cement mortar.

The water reducing agent served to improve the workability or fluidity of the cement mortar and to make the fibers disperse more evenly.

The water reducing agent was TAMOL L Concentrate, which was a concentrated aqueous solution (solids content 47.5 wt. %) of the sodium salt of a condensed napthalene sulfonic acid, manufactured by Rohm and Haas Co. It is an anionic surfactant, also known as sodium naphthalene sulfonate-formaldehyde condensate. The amount used was 1% by weight of the cement.

The accelerating admixtures used, labeled I and II, were described in Example III.

The cement powder, sand and methods of mechanical and electrical testing are the same as those of Example I. Unless otherwise stated, the sand/cement weight ratio is 1:2 and the water/cement weight ratio is 1:2.8. (In some cases, the water/cement weight ratio was 1:3.7 in order to maintain the mortar at almost the same flow value of about 130±5 mm).

A fiber content of 0.5% (by weight of cement) and a fiber length of 5.1 mm were used.

The short carbon fibers were first mixed with the cement powder and sand. Then water and the chemical agents were put together and stirred with a mixer for 2 to 3 min. Then the mortar was poured into a mold. After 24 hr the specimens were demolded and left in an air-conditioned room at 20°-22° C. and 50–70% relative humidity. After curing for 1 to 28 days, they were tested.

Table V gives the mechanical data obtained after 1–28 days of curing. For a curing age of 7 days, by using only carbon fibers (no water reducing agent or accelerating admixture) the tensile strength and flexural strength increased by 18 and 31%, respectively. For the same curing age of 7 days, using carbon fibers, a water reducing agent and accelerating admixture II, the compressive, tensile and flexural strengths increased by 18, 164 and 112%, respectively. Accelerating admixture I also caused much strengthening.

Figure 7:
FIG. 7 is a scanning electron micrograph of the fracture surface of carbon fiber (5.1 mm long on the average) reinforced cement mortar without any chemical agent after tensile testing.
Figure 8:
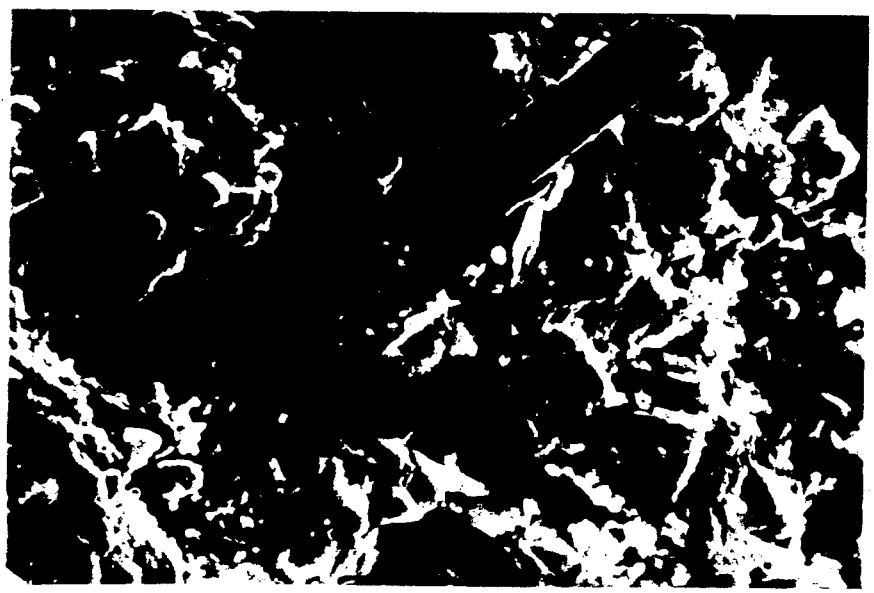
FIG. 8 is a scanning electron micrograph of the fracture surface of carbon fiber (5.1 mm long on the average) reinforced cement mortar with a water reducing agent and accelerating admixture I after tensile testing.

The strengthening due to the presence of an accelerating admixture is attributed to the improved bonding between the carbon fibers and the cement mortar. The improved bonding is revealed by the scanning electron microscope (SEM) photographs of FIG. 7 and 8, which are at the same magnification and were taken from the tensile fracture surfaces of a carbon fiber reinforced cement mortar without any chemical agent and a carbon fiber reinforced cement mortar with both a water reducing agent and accelerating admixture I, respectively. FIG. 7 shows carbon fibers with a relatively smooth surface, whereas FIG. 8 shows carbon fibers with more adherends on their surface. In addition, the carbon fibers in FIG. 7 are much more severely pulled out than those in FIG. 8, as clearly shown in photographs taken at lower magnifications. There is much difference in the matrix also between FIG. 7 and 8; FIG. 8 shows the formation of more well developed and larger crystalline particles in the matrix.

Figure 9:
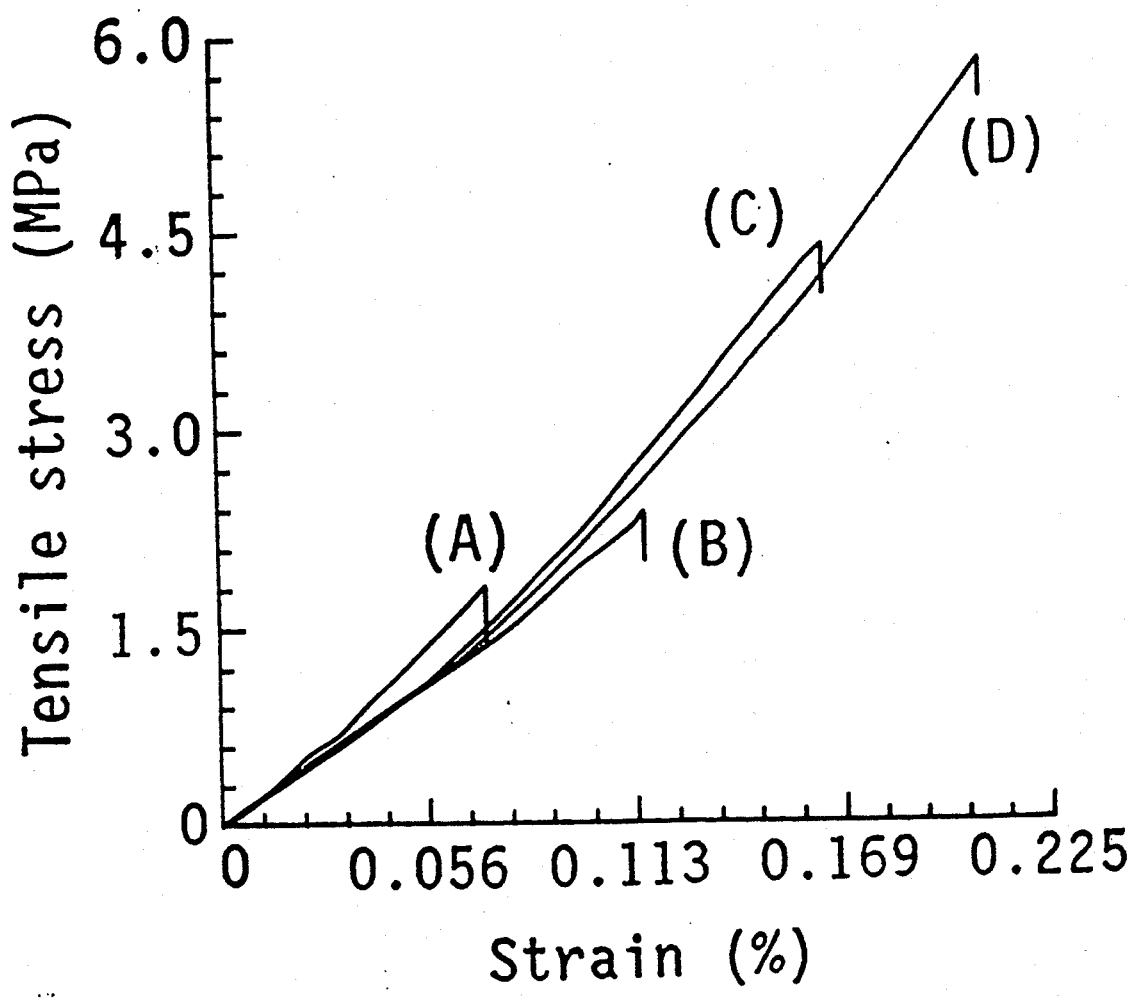
FIG. 9 is a graph of the tensile stress in MPa vs. strain in percent for:
(A) plain cement mortar,
(B) carbon fiber (5.1 mm long on the average) reinforced cement mortar (0.5% fibers) with no chemical agent,
(C) carbon fiber (5.1 mm long on the average) reinforced cement mortar (0.5% fibers) with a first water reducing agent and accelerating admixture,
(D) carbon fiber (5.1 mm long on the average) reinforced cement mortar (0.5% fibers) with a second water reducing agent and accelerating admixture.

FIG. 9 shows tensile stress-strain curves of (a) plain cement, (b) carbon fiber reinforced cement (0.5% fibers) with no chemical agent, (c) carbon fiber reinforced cement (0.5% fibers) with a water reducing agent and accelerating admixture I, and (d) carbon fiber reinforced cement (0.5% fibers) with a water reducing agent and accelerating admixture II. The ductility is clearly much increased by the carbon fibers and the chemical agents.

The electrical resistivity data obtained after 2 days of curing are shown in Table VI, together with the mechanical data obtained after 1 day of curing. Comparison of rows 1 and 2 of Table VI shows that the addition of 0.5% carbon fibers (without chemical agents) to plain cement lowered the electrical resistivity to 3.1% of the plain cement value. Comparison of rows 1 and 3 shows that the addition of accelerating admixture I (without carbon fibers or water reducing agent) to plain cement mortar lowered the electrical resistivity to 37% of the plain cement value, probably because of the electrolyte introduced by the accelerating admixture into the matrix, which contained some moisture. Comparison of rows 1 and 4 shows that the addition of carbon fibers and accelerating admixture I to plain cement mortar lowered the electrical resistivity to 0.02% of the plain cement mortar value. Comparison of rows 4 and 5 shows that the further addition of a water reducing agent raised the electrical resistivity slightly, probably because the water reducing agent introduced foam.

Table VI also shows that the presence of carbon fibers, together with accelerating admixture I and a water reducing agent, gives the most strengthening—about twice the strengths of plain cement mortar.

TABLE V

Effect of both carbon fibers and chemical agents on the strengths

| | | Strength (MPa) | | | | | | | | | | |
|---|---|---|---|---|---|---|---|---|---|---|---|---|
| | | Compressive | | | | Tensile | | | | Flexural | | | |
| Curing time (days): | | 1 | 3 | 7 | 28 | 1 | 3 | 7 | 28 | 1 | 3 | 7 | 28 |
| 1 | Plain cement | 14.9 | 27.8 | 29.6 | / | 1.47 | 1.64 | 2.23 | / | 3.12 | 3.68 | 3.76 | 8.36 |
| 2 | With carbon fibers | 15.8 | 26.1 | 29.8 | / | 2.28 | 2.17 | 2.64 | 3.50 | 4.24 | 5.16 | 4.92 | 9.76 |
| 3* | With carbon fibers, water reducing agent and accelerating admixture I | 28.8 | 35.8 | 38.9 | / | 3.10 | 5.03 | 4.76 | 5.43 | 5.36 | 6.48 | 7.12 | 10.24 |
| 4* | With carbon fibers, water reducing agent and accelerating admixture II | 22.8 | 38.3 | 35.0 | / | 3.43 | 5.11 | 5.88 | / | 6.88 | 7.60 | 7.96 | / |

*Water/cement weight ratio is 1:3.7.

Other than accelerating admixtures I and II, other accelerating admixtures can also be used with carbon fibers to give effects similar to those described in Tables V and VI and FIG. 8 and 9. In general, an accelerating admixture comprises polyethanolamine and one of metal sulfate plus metal aluminum sulfate or metal nitrite plus metal chloride. The polyethanolamine is at least one of triethanolamine and diethanolamine and is present in amount of from about 0.02% to about 0.1% by weight of the cement. The metal sulfate is at least one of sodium sulfate, potassium sulfate and calcium sulfate, and is present in amoun of from about 0.1% to about 1% by weight of the cement. The metal aluminum sulfate is at least one of potassium aluminum sulfate and sodium aluminum sulfate, and is present in amount of from about 0.1% to about 1% by weight of the cement. The metal nitrite is at least one of sodium nitrite, potassium nitrite and calcium nitrite, and is present in amount of from about 0.1% to about 1% by weight of the cement. The metal chloride is at least one of sodium chloride, potassium chloride and calcium chloride, and is present in amount of from about 0.1% to about 3% by weight of the cement.

Other than sodium naphthalene sulfonate-formaldehyde condensate, other water reducing agents can also be used with carbon fibers to give effects similar to those described in Tables V and VI and FIG. 8 and 9. In general, a water reducing agent is at least one of lignosulfonate, sodium naphthalene sulfonate-formaldehyde condensate, melamine sulfonate-formaldehyde condensate and polyalkylaryl sulfonate, and the water reducing agent is present in amount of from about 0.5% to about 2% by weight of the cement.

TABLE VI

Effect of both carbon fibers and chemical agents on the electrical resistivity and strengths

| | | Electrical resistivity (ohm.cm) | Strength (MPa) | | |
|---|---|---|---|---|---|
| | | | Compressive | Tensile | Flexural |
| 1 | Plain cement | 35570 | 15.8 | 1.47 | 3.12 |
| 2 | With carbon fibers | 1115 | 15.8 | 2.03 | 4.00 |
| 3 | With accelerating admixture I | 13150 | 22.2 | 2.42 | 3.96 |
| 4 | With carbon fibers and accelerating admixture I | 6.7 | 21.5 | 2.66 | 4.76 |
| 5* | With carbon fibers, water reducing agent and accelerating admixture I | 43.0 | 28.0 | 3.47 | 5.36 |

*Water/cement mortar ratio is 1:3.7.

Accelerating admixtures were used because they make the cement particles disperse in water more easily, solutize the cement particles to form hydrolized calcium silicate gel, make the cement hydrate faster and generate crystallize compounds which fill the voids caused by the presence of the fibers. Therefore, by using an accelerating admixture, one enhances the strength of cement mortar, especially enhancing the early strength. The increase in strength of the cement mortar is accompanied by the increase in the bond strength between the fibers and the cement matrix.

The addition of a water reducing agent and an accelerating admixture to cement mortar is very effective for improving the workability and the dispersion of carbon fibers and for enhancing the strength of the cement composite. In this example, the compressive, tensile and flexural strengths increased by about 18–31%, 113–164% and 89–112%, respectively, for a curing age of 7 days. The ductility was also improved by using both carbon fibers and chemical agents.

Using chemical agents in short carbon fiber reinforced cements doubles the tensile and flexural strengths with only 0.3 vol. % (0.5% by weight of cement) of short carbon fibers whereas previous reported tests (without using chemical agents) required 4 vol. % short carbon fibers in order to double these strengths, see Akihama et al., Concrete International, 10 (1), 40 (1988). Because of the relatively high cost of carbon fibers, this means much cost savings in the use of the improved carbon fiber reinforced cements of this invention.

Using 0.3 vol. % (0.5% by weight of cement) short carbon fibers together with the accelerating admixture (which also serves to increase the electrical conductivity) decreases the electrical resistivity of the cement by a factor of 5000, resulting in an electrical resistivity of only 6.7 ohm.cm.

Carbon fibers present in amount of 0.5% by weight of cement correspond to 0.28 vol. % of the cement mortar, or 4.5 Kg fibers/$m^3$ cement mortar.

EXAMPLE V

This example pertains to the effect of continuous carbon fibers.

Cement mortars reinforced by unidirectional continuous carbon fibers were prepared by arranging a small amount of carbon fibers only near one side of a specimen with a hand lay-up method. The amount of carbon fibers ranged from 0.10 to 0.50% (by weight of the cement).

Continuous carbon fibers were pitch-based and sized. They were Amoco's Thornel P-25 X 2000-filament strands. Their properties are shown in Table VII.

TABLE VII

| Properties of continuous carbon fibers | |
|---|---|
| Filament diameter | 11 μm |
| Tensile strength | 1.40 GPa |
| Tensile modulus | 1.60 GPa |
| Elongation at break | 0.90% |
| Electrical resistivity | 13 μohm.m |
| Specific gravity | 1.90 |
| Carbon content | 97+% wt. |

The accelerating admixtures, water reducing agent, cement powder, sand, water/cement ratio, sand/cement ratio and methods of mechanical and electrical testing are the same as those of Example IV.

Cement powder and sand were first mixed. Then water and the chemical agents were put together and stirred with a mixer for 2 to 3 min. Then the cement mortar with a thickness of 1-2 mm was placed in the bottom of a 1.57 by 1.57 by 6.30 in (4.0 by 4.0 by 16.0 cm) mold. Continuous unidirectional carbon fibers, which had been previously impregnated with cement mortar, were placed on the mortar in the mold. Finally the rest of the mortar was poured into the mold. The specimens were demolded after 1 day and then they were cured in an air-conditioned room at 20°±2° C. and a relative humidity of 50-65%.

Figure 10:
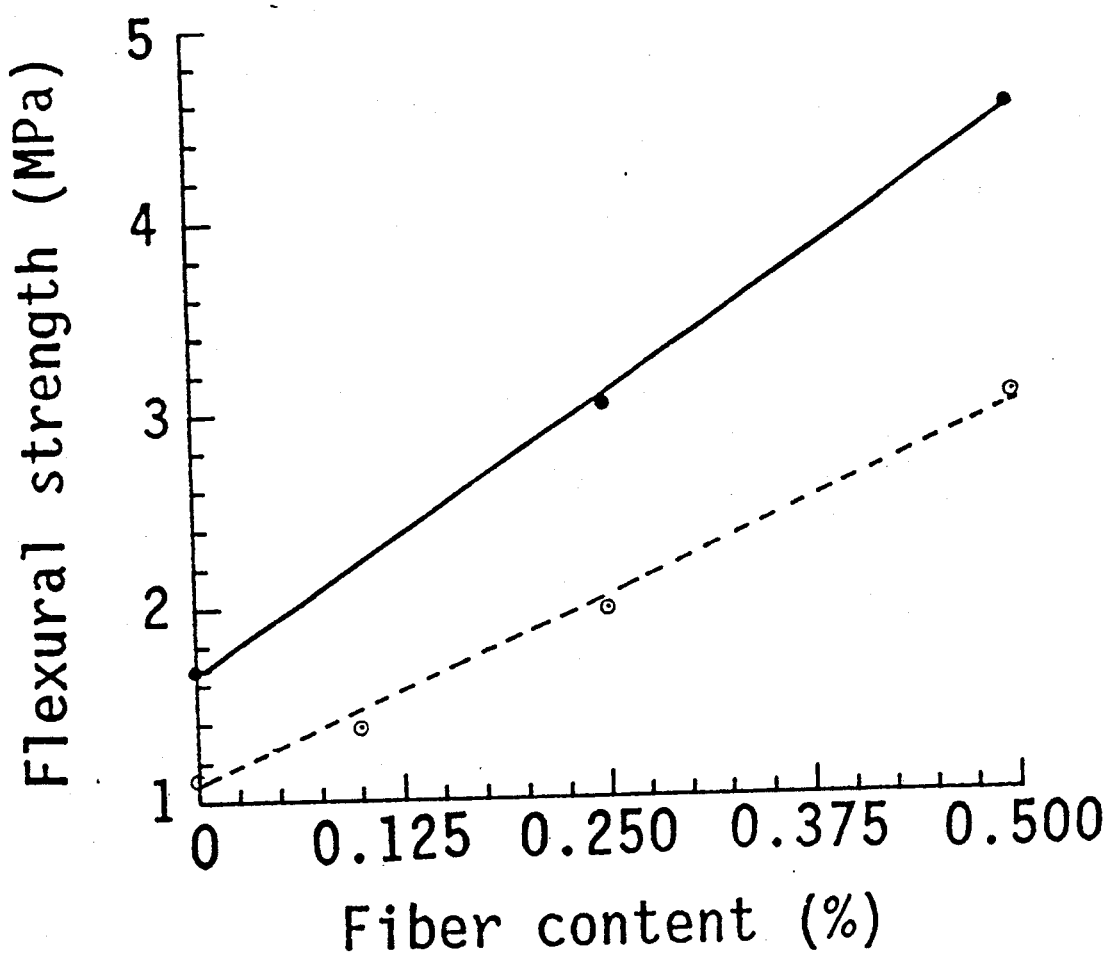
FIG. 10 is a graphy of the flexural strength in MPa vs. the carbon fiber content in percent by weight of the cement, of continuous carbon fiber reinforced cement mortar with the first water reducing agent and accelerating admixture (solid line), and that without any chemical agent (dashed line)
Figure 11:
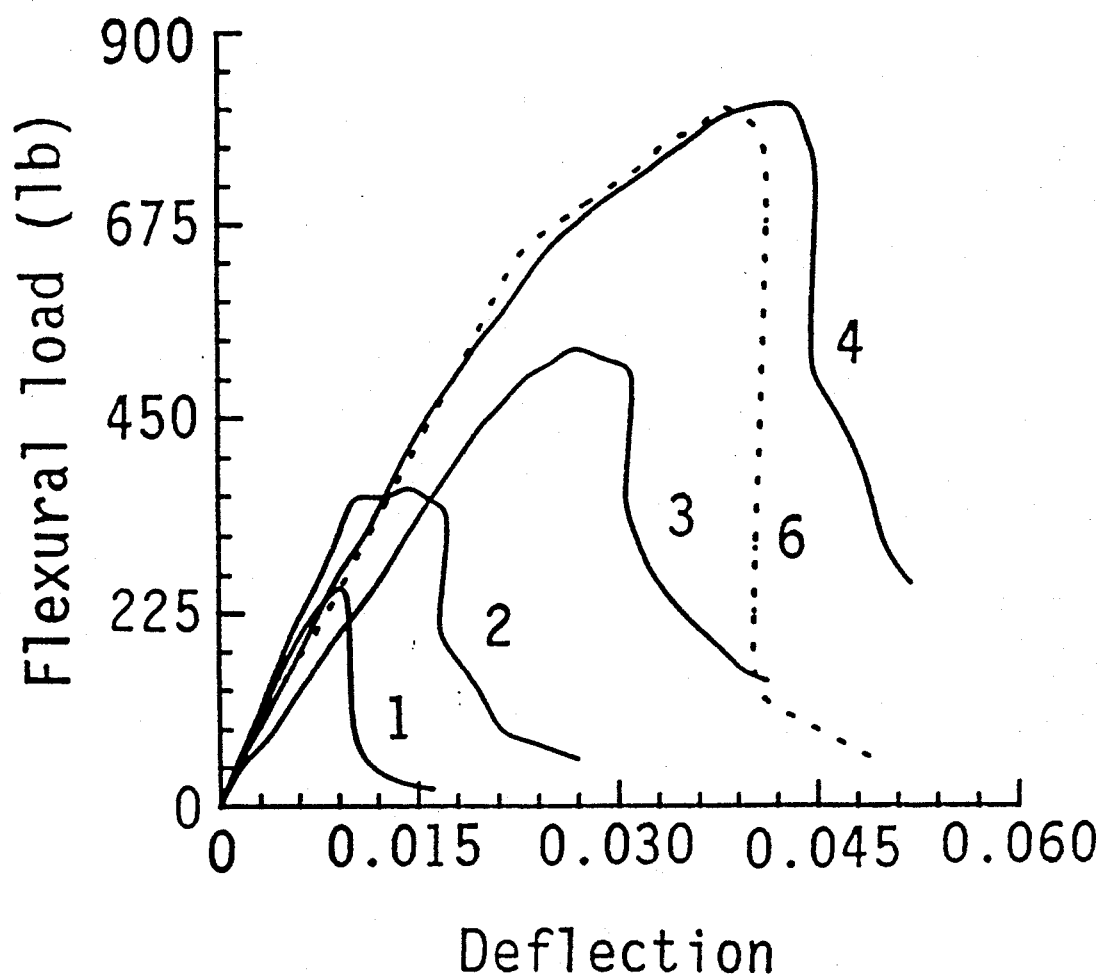
FIG. 11 is a graph of the flexural load in 1 b vs. the deflection in a dimensionless unit during the flexural testing of different cement mortars.

The flexural strength was measured after 7 days of curing. The results are shown in Table VIII and FIG. 10. At the same carbon fiber content, the flexural strength was higher when the water reducing agent and accelerating admixture I were used. Comparison of rows 4 and 6 of Table VIII shows that the flexural strength of the specimen with 0.25% fibers and chemical agents was almost the same as that of the specimen with 0.5% fibers and no chemical agents. Comparison of rows 1 and 7 shows that the strengthening reached a factor of 4 when carbon fibers (0.5%), the water reducing agent and the accelerating admixture I were used. FIG. 11 shows the relation between the flexural strength and deflection for the specimens corresponding to rows 1, 2, 3, 4 and 6 of Table VIII. The deflection is taken as the amount of crosshead motion divided by the thickness (4.0 cm) of the specimen along the direction of crosshead motion.

TABLE VIII

Effect of continuous carbon fibers on the flexural strength

| | Fiber content (%) | Flexural strength (MPa) |
|---|---|---|
| 1 Plain cement mortar | 0 | 4.48 |
| 2 | 0.10 | 5.52 |
| 3 With carbon fibers | 0.25 | 7.92 |
| 4 | 0.50 | 12.24 |
| 5* With carbon fibers and | 0 | 6.72 |
| 6* water reducing agent and | 0.25 | 12.08 |
| 7* accelerating admixture I | 0.50 | 18.20 |

*Water/cement weight ratio is 1:3.7.

Using 0.13 vol. % (0.25% by weight of cement) continuous carbon fibers, together with chemical agents, increases the flexural strength by a factor of 2.7.

For bending construction, by arranging unidirectional continuous carbon fibers near one side of a member, the effective factor of carbon fibers to enhance the flexural strength is higher than that of the case of randomly dispersed short carbon fibers. The use of 0.25% (by weight of cement) fibers, together with chemical agents, increased the flexural strength by 170%; the use of 0.50% fibers by weight of cement (or 0.26 vol. % of cement mortar), together with chemical agents, increased the flexural strength by 306%.

The continuous carbon fibers may be woven, braided, crocheted or otherwise connected to from a fabric, a sheet, a rod, a tube or a framework. Subsequently, cement and other ingredients may be added to the fiber structure as described in this example in order to form a fiber reinforced cement mortar structure.

EXAMPLE VI

This example pertains to the effect of carbon fibers and chemical agents (accelerating admixtures) on the electromagnetic interference (EMI) shielding effectiveness of cement mortar.

The cement powder used was Portland cement (Type III) produced by the Lafarge Corporation. It is composed chiefly of $3CaO.SiO_2$ (47.1 wt %), $2CaO.SiO_2$ (26.9 wt %), $3CaO.Al_2O_3$ (9.0 wt %), $4CaO.Al_2O_3.Fe_2O_3$ (4.8 wt %), together with several minor oxides such as $SO_3$ (3.80 wt %), $MgO$ (3.28 wt %), etc.

The short carbon fibers (3 mm long) used were pitch-based and unsized (Carboflex chopped carbon fibers provided by Ashland Petroleum Company), and were among the cheapest carbon fibers available. The fiber properties are shown in Table I.

The sand used was crystalline silica (quartz), middle grade. The sand/cement ratio was 1.0 by weight and the water/cement ratio was 0.5 by weight.

The chemical agents used were of triethanolamine (0.06% by weight of cement), sodium sulfate (0.5 wt %) and potassium aluminum sulfate (0.5 wt %). The chemical agents served as an accelerating admixture, which make the cement particles disperse in water more easily, solutize the cement particles to form hydrolysed calcium silicate gel, make the cement hydrate faster and generate crystalline compounds which fill the voids caused by the presence of the fibers.

The short carbon fibers were first mixed with the cement powder and sand. Then water and the chemical agents were put together and stirred with a mixer for 2 to 3 min. The mortar was then poured into a mold. After 24h the specimens were demolded and left to cure in an air-conditioned room at 20°-22° C. and 50-70% relative humidity for 1 day. Longer curing times to 7 days did not change the results of shielding effectiveness.

The shielding effectiveness of specimens was measured using the coaxial cable method. The set-up consists of an Elgal SET 19A shielding effectiveness tester, which is connected with a coaxial cable to a Wavetek 2002A sweep signal generator (10-2500 MHz) on one side and on the other side to an Alfred Electronics E101 variable attenuator (0-50±0.1 dB), a Hewlett Packard 423A crystal detector and a DC voltmeter. The crystal detector serves to convert the signal to a voltage.

The sample is tested in the form of an annular disc, with an outside diameter of 97.4 mm and an inside diameter of 28.8 mm. Its thickness ranges from 3.6 to 4.1 mm. Silver conductive paint is applied to the surface of the centre hole of the sample and to the flat surfaces of the sample for 5.1 mm from the inner rim of the annular disc to allow a continuous metallic contact to be made between the sample and the steel tubing in the center of the tester. Silver paint is also applied to the flat surfaces of the sample for 3.7 mm from the outer rim of the annular disc to allow a continuous metallic contact between the sample and the steel chamber of the tester.

After inserting the sample in the tester, the variable attenuator is set to zero and the voltmeter is read. Then the sample is removed from the tester and the variable attenuator is adjusted until the voltmeter has the same value as the case with the sample in the tester. The reading of the adjusted attenuator gives the attenuation, which describes the shielding effectiveness.

Table IX gives the shielding effectiveness at 1.0, 1.5, and 2.0 GHz for nine types of cement mortars (for example, electromagnetic attenuation at 1.5 GHz frequency increased from 0.5 dB for plain cement to 10.2 dB for the same thickness of disc (3.6 mm) with chemical agents and short carbon fibers in the amount of 0.5% by weight of cement). Comparison of Rows 1 and 2 of Table IX shows that the use of chemical agents (even without carbon fibers) enhances the shielding effectiveness substantially. This is consistent with the fact that the presence of these chemical agents reduces the electrical resistivity of the cement. However, an even larger enhancement can be obtained by the further addition of carbon fibers, as shown by the comparison of Rows 1, 2 and 3. The use of chemical agents and 0.5% fibers gives a shielding effectiveness comparable to that obtained by the use of no chemical agents and 1% fibers, as shown by comparing Rows 3 and 4. Furthermore, comparison of Rows 4, 6, 8 and 9 and of Rows 3, 5, and 7 shows that the shielding effectiveness increases monotonically with increasing fiber content. The trends are similar for all three frequencies.

Hence, short carbon fibers (as low as 0.5% by weight of cement or 0.21% by volume of cement mortar) and chemical agents (triethanolamine, sodium sulfate and potassium aluminum sulfate) are effective in increasing the electromagnetic interference shielding effectiveness of cement mortar to about 10 dB or more in the frequency range 1.0 to 2.0 GHz for a mortar thickness of 4 mm. This degree of shielding effectiveness is sufficient for the construction of electromagnetic interference shielded structures. A small carbon fiber content is desirable for material cost saving and ease of dispersing the fibers.

While the foregoing examples have considered a sand/cement weight ratio of 1:2, other ratios well-known in the art can be substituted therefor. While Portland cements have been considered hereinbefore, other hydraulic cements can be substituted therefor. The sand-cement ratios considered in the specific examples have been maintained at a set ratio in order to be able to compare the results in a meaningful fashion. Much larger proportions of sand will usually be used in structural applications and large proportions of aggregate may be utilized.

While the foregoing examples have considered water/cement weight ratios of 1:2.8 and 1:3.7, other ratios well-known in the art can be substituted therefor.

While the foregoing examples have considered a time period of 24 hr between pouring the mortar into a mold and demolding, other time periods well-known in the art can be substituted therefor.

While the foregoing examples have considered curing the mortar at 20°–22° C. and 50–70% relative humidity, other temperatures and relative humidities well-known in the art can be substituted therefor.

While Examples III, IV and V have considered accelerating admixtures I and II, other accelerating admixtures can be substituted therefor, as described in Example IV.

While Examples IV and V have considered sodium naphthalene sulfonate-formaldehyde condensate as the water reducing agent, other water reducing agents can be substituted therefor, as described in Example IV.

I claim as my invention:

1. A cement concrete-carbon fiber structure which displays high tensile and flexural strengths, low electrical resistivity and high electromagnetic interference shielding effectiveness, said structure comprising Portland cement concrete having carbon fibers dispersed therein in amount of from about 0.1% to about 4% by weight of the cement in said structure, said structure during the fabrication thereof having added thereto as an accelerating admixture polyethanolamine plus either (1) metal sulfate and metal aluminum sulfate or

TABLE IX

Shielding effectiveness of cement mortars

| No. | Material | Attenuation (dB) | | | Thickness (mm) |
|---|---|---|---|---|---|
| | | 1.0 GHz | 1.5 GHz | 2.0 GHz | |
| 1 | Plain cement | 0.4 | 0.5 | 1.5 | 3.6 |
| 2 | Cement mortar + chemical agents | 3.7 | 3.7 | 7.3 | 4.0 |
| 3 | Cement mortar + chemical agents + 0.5% fibers | 9.4 | 10.2 | 11.7 | 3.6 |
| 4 | Cement mortar + 1% fibers | 10.2 | 9.8 | 15.8 | 3.8 |
| 5 | Cement mortar + chemical agents + 1% fibers | 14.8 | 12.3 | 18.5 | 3.8 |
| 6 | Cement mortar + 2% fibers | 16.5 | 15.2 | 21.8 | 3.9 |
| 7 | Cement mortar + chemical agents + 2% fibers | 15.6 | 13.7 | 19.6 | 3.9 |
| 8 | Cement mortar + 3% fibers | 19.2 | 16.8 | 23.8 | 4.1 |
| 9 | Cement mortar + 4% fibers | 21.1 | 18.6 | 25.1 | 3.9 |

While Examples I, II, IV and V have considered pitch-based carbon fibers, other carbon fibers, such as textile fiber-based carbon fibers and vapor-grown carbon fibers, can be substituted therefor.

While Examples I, II and IV have considered unsized short carbon fibers, sized short carbon fibers can be substituted therefor. While Example V has considered sized continuous carbon fibers, unsized carbon fibers can be substituted therefor.

While the foregoing examples have considered Type I Portland cement, other hydraulic cements, such as Type II Portland cement and Type III Portland cement, can be substituted therefor.

(2) metal nitrite and metal chloride, said polyethanolamine addition present in amount of from about 0.02% to about 0.1% by weight of the cement in said structure, said metal sulfate addition if used present in amount of from about 0.1% to about 1% by weight of the cement in said structure, said metal aluminum sulfate addition if used present in amount of from about 0.1% to about 1% by weight of the cement in said structure, said metal nitrite addition if used present in amount of from about 0.1% to about 1% by weight of the cement in said structure, and said metal chloride addition if used present in amount of from about 0.1% to about 3% by weight of the cement in said structure.

2. The structure of claim 1, wherein said polyethanolamine is triethanolamine present in amount of about 0.06% by weight of said cement.

3. The structure of claim 1, wherein said metal sulfate is at least one of sodium sulfate, potassium sulfate and calcium sulfate.

4. The structure of claim 3, wherein said metal sulfate is sodium sulfate present in amount of about 0.5% by weight of said cement.

5. The structure of claim 1, wherein said metal aluminum sulfate is at least one of potassium aluminum sulfate and sodium aluminum sulfate.

6. The structure of claim 5, wherein said metal aluminum sulfate is potassium aluminum sulfate present in amount of about 0.5% by weight of said cement.

7. The structure of claim 1, wherein said metal nitrite is at least one of sodium nitrite, potassium nitrite and calcium nitrite.

8. The structure of claim 7, wherein said metal nitrite is sodium nitrite present in amount of about 0.5% by weight of said cement.

9. The structure of claim 1, wherein said metal chloride is at least one of sodium chloride, potassium chloride and calcium chloride.

10. The structure of claim 9, wherein said metal chloride is sodium chloride present in amount of about 0.5% by weight of said cement.

11. The structure of claim 1, wherein during the fabrication thereof there is also added thereto a water reducing agent selected from at least one of the group consisting of lignosulfonate, sodium naphthalene sulfonate-formaldehyde condensate, melamine sulfonate-formaldehyde condensate and polyalkylaryl sulfonate, said water reducing agent present in amount of from about 0.5% to about 2% by weight of said cement.

12. The structure of claim 34, wherein said water reducing agent is sodium naphthalene sulfonate-formaldehyde condensate present in amount of about 1% by weight of said cement.

13. The structure of claim 1, wherein the amount of said carbon fibers is about 0.5% by weight of said cement.

14. The structure of claim 1, wherein the average lenght of said carbon fibers is from about 2 mm to about 6 mm.

15. The structure of claim 1, wherein at least a substantial portion of said carbon fibers are continuous.

16. The structure of claim 1, wherein at least a substantial portion of said carbon fibers extend in the same direction.

17. The structure of claim 1, wherein said carbon fibers are conformed as a fabric, sheet, rod, tube or framework.

18. A cement concrete-carbon fiber structure which displays high tensile and flexural strengths, low electrical resistivity and high electromagnetic interference shielding effectiveness, said structure comprising Portland cement concrete having carbon fibers dispersed therein in amount of from about 0.1% to about 4% by weight of the cement in said structure, said structure during the fabrication thereof having added thereto as an accelerating agent at least one alkanolamine selected from the group consisting of triethanolamine and diethanolamine and either (1) at least one metal sulfate of the group consisting of sodium sulfate, potassium sulfate and calcium sulfate plus at least one metal aluminum sulfate of the group consisting of potassium aluminum sulfate and sodium aluminum sulfate or (2) at least one metal nitrite of the group consisting of sodium nitrite, potassium nitrite and calcium nitrite plus at least one metal chloride of the group consisting of sodium chloride, potassium chloride and calcium chloride, said alkanolamine addition present in amount of from about 0.02% to about 0.1% by weight of the cement in said structure, said metal sulfate addition if used present in amount of from about 0.1% to about 1% by weight of the cement in said structure, said metal aluminum sulfate addition if used present in amount of from about 0.1% to about 1% by weight of the cement in said structure, said metal nitrite addition if used present in amount of from about 0.1% to about 1% by weight of the cement in said structure, and said metal chloride addition if used present in amount of from about 0.1% to about 3% by weight of the cement in said structure.

19. The structure of claim 18, wherein during the fabrication of said structure, there is also added thereto a water reducing agent selected from at least one of a lignosulfonate, sodium naphthalene sulfonate-formaldehyde, melamine sulfonate-formaldehyde condensate and polyalkylaryl sulfonate, and said water reducing agent present in amount of from about 0.5% to about 2% by weight of said cement.

* * * * *